J. W. AYLSWORTH & E. L. AIKEN.
PROCESS OF MAKING SOUND RECORD MOLDS.
APPLICATION FILED NOV. 17, 1910.

1,061,258.

Patented May 13, 1913.

Witnesses:

Inventor:

UNITED STATES PATENT OFFICE.

JONAS W. AYLSWORTH, OF EAST ORANGE, AND EDWARD L. AIKEN, OF ORANGE, NEW JERSEY, ASSIGNORS, BY MESNE ASSIGNMENTS, TO THOMAS A. EDISON, INCORPORATED, OF WEST ORANGE, NEW JERSEY, A CORPORATION OF NEW JERSEY.

PROCESS OF MAKING SOUND-RECORD MOLDS.

1,061,258. Specification of Letters Patent. Patented May 13, 1913.

Application filed November 17, 1910. Serial No. 592,764.

*To all whom it may concern:*

Be it known that we, JONAS W. AYLSWORTH, a citizen of the United States, and a resident of East Orange, Essex county, New Jersey, and EDWARD L. AIKEN, a citizen of the United States, and a resident of Orange, Essex county, New Jersey, have made a certain new and useful Invention in Improvements in Processes of Making Sound-Record Molds, of which the following is a description.

Our invention relates to a process of making molds for disk sound records and similar objects, in which an electrolytically formed thin mold, usually of copper, has secured thereto a thick backing plate of suitable material, as copper. Backing plates have been secured to the thin molds by applying molten solder to the surface of the backing plate and the back of the mold, and pressing the same together, but when this has been done, great difficulty has been experienced in practice due to the fact that it is almost impossible to prevent the molten solder from getting on the delicate molded surface of the record mold and thus ruining the same. We overcome this difficulty by our improved process which will shortly be described.

In order that our invention may be more clearly understood, attention is hereby directed to the accompanying drawings forming part of this specification, and illustrating various steps in our preferred process.

Figure 1:
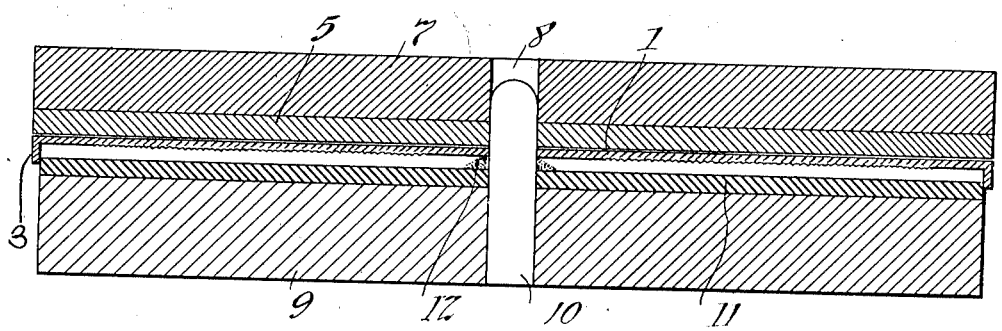
Figure 2:
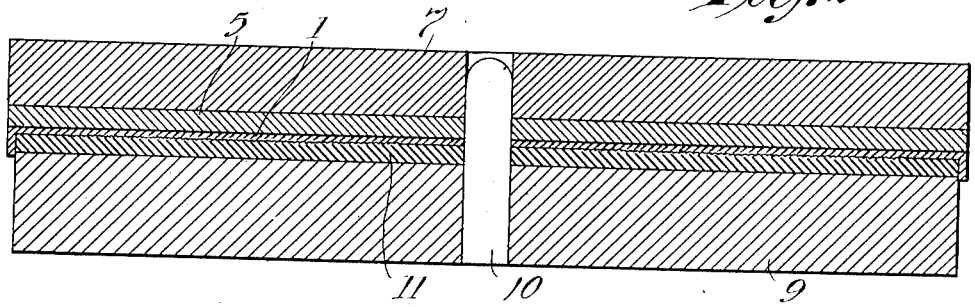
Figure 3:
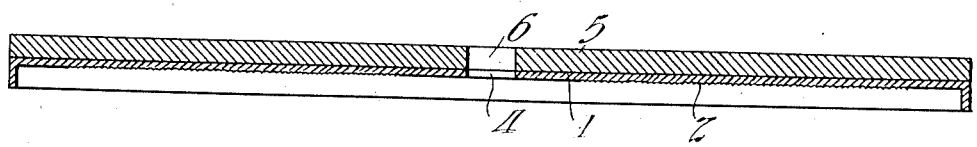

In the drawings, Figure 1 illustrates in cross section a mold and backing about to be soldered together and assembled to coöperate with other parts shown. Fig. 2 is a similar view showing the parts being pressed together; and Fig. 3 is a cross section through the mold and backing soldered together in finished condition.

Our improved process is preferably carried out as follows:—The mold 1 which, as illustrated, is a mold for pressing disk sound records, is formed with the mold surface 2 and the depending peripheral flange 3. The mold also has a central opening 4 therethrough. A soldering composition of equal parts of tin and lead, or if desired, pure tin, is placed in solid form upon the back of mold 1 and the backing plate 5 laid thereon with its central opening 6 in line with the opening 4 through the mold 1. A plate 7 preferably of cast iron is placed on top of backing plate 5 with its opening 8 in line with openings 4 and 6. The mold, backing plate, and plate 7 are then positioned as illustrated in Fig. 1, upon the plate 9 having the stud 10 extending vertically upward through and from the same, this stud then extending upwardly into the alined central openings of the mold, backing plate and plate 7 to center the same. A plate 11 of material adapted not to injure the record surface 2 of mold 1 is placed upon the top of plate 9 before mold 1 is positioned upon pin 10, and a pile of granular material 12 to be described is placed upon the top of plate 11 surrounding stud 10 for a purpose to be described.

The plate 11 should be of a substance which will not injure the delicate record surface 2 of mold 1 when pressure is applied to the parts to solder the backing plate to the mold, and it also should not adhere to the record surface after the soldering operation is complete. We have found that thick blotting paper is suitable for this purpose. We have found that we also may use for plate 11 a disk of a phenolic condensation product of such a nature as to be comparatively soft during the pressing operation, so as not to injure the record surface and not to adhere to the mold surface after the operation is completed. Thus, we may use either a final infusible phenolic condensation product which contains a plasticity agent or solid solvent such as mono-nitronaphthalene or mono-chloro-naphthalene, or other substances described in application of Aylsworth Serial No. 496,060, plastic composition and process of manufacturing the same, filed May 14, 1909. A final condensation product formed as described in said application and containing a plasticity agent as described, has the property of becoming somewhat plastic when sufficiently heated, and sufficient heat would be supplied through plate 7, backing 5 and mold 1 during the soldering operation. Or, plate 11 may be formed of a mixture of fusible phenolic condensation product similar to the substance termed "phenol resin" in the application above referred to, or in application of Aylsworth, Serial No. 543,238, phenolic condensation product and method of preparing the same, filed February 11, 1910, with a sufficient quantity of a substance containing the methylene radical $CH_2$ to react with the phenol resin upon application of sufficient heat to combine with the resin and form a hard infusible phenolic condensation product by such reaction. Such a substance may be formaldehyde, as described in said application of Aylsworth, Serial No. 496,060, or may and preferably is hexa-methylene-tetra-amin, as described in application of Aylsworth Serial No. 543,238, referred to. A plasticity agent such as mono-nitro-naphthalene may also be included in the mixture. When disk 11 is formed of a mixture such as described, it is sufficiently soft not to injure the record surface of the mold and hardens during the pressing operation necessary for soldering the backing to the mold with application of heat to form the infusible hard final product which will not adhere to the mold surface after cooling.

The powder 12 which is placed around the stud above plate 11 and mold 1 is for the purpose of sealing the opening through the mold around stud 10 to prevent the solder when molten from flowing through the same and getting on the record surface of the mold. This powder is preferably a mixture in granulated form of a fusible phenolic condensation product or phenol resin and a hardening agent, as hexa-methylene-tetra-amin, such as has just been described in connection with disk 11. When heat and pressure are applied to plate 7 to solder the backing to the mold, the powder 12 fuses and seals the opening about stud 10 to prevent the solder flowing therethrough, the fused powder then hardening during the operation into a final infusible condensation product which does not adhere to the mold surface.

In the operation of our process, when the parts have been arranged as described, heat and pressure are applied to the cast iron plate 7. The cast iron plate 7 may be heated to a temperature of from 500 to 600 degrees F. before it is placed upon the backing plate, and pressure then applied thereto, preferably by a powerful press. During this operation the heat of the plate 7 passes through plate 5 and mold 1, fusing the solder between plate 5 and mold 1 and melting powder 12, and causing the same to seal the opening about stud 10, and also causing the reaction described between the ingredients of plate 11 if the same is formed of a phenolic condensation product or mixture of ingredients which react to form a final condensation product, as described. Surplus solder when molten is expelled from between backing plate 5 and mold 1 at the periphery. The depending annular flange 3 upon mold 1 prevents the molten solder from running around the edge of the mold onto the record surface thereof, and the fused mass 12 which subsequently hardens prevents the molten solder from reaching the record surface by means of the central opening through the mold. When the soldering operation is complete, the pressure is removed and the mold 1 with backing plate 5 soldered thereto, as shown in Fig. 3, removed.

Instead of using the powder 12 to seal the opening around center pin 10, we may proceed as follows:—Blotting paper or the like is used instead of the condensation product plate 11, as described, to support the record surface of the mold, and a washer of metal or other suitable substance is placed upon plate 9 around pin 10, the blotting paper being placed above the washer, and powder 12 not being used. When now pressure is applied to plate 7, the thickness of the washer is sufficient to cause the blotting paper immediately above the same to seal the opening around the pin and prevent the solder from flowing through the same.

Having now described our invention, what we claim and desire to protect by Letters Patent is as follows:—

1. The process of making disk sound record molds having central holes therein, consisting in placing a backing plate upon the back of a disk mold with soldering material interposed between the same, and pressing the same together with application of heat to solder the backing to the mold, while sealing the central hole through the mold to prevent the soldering material running through the same, substantially as described.

2. The process of making disk sound record molds, consisting in placing a backing plate upon the back of a disk mold with soldering material interposed between the same, laying the mold face downward upon a member which will not injure the mold surface or adhere to the same under the necessary heat and pressure, exerting pressure upon the backing plate with the application of heat sufficient to melt the soldering material and solder the backing plate and mold together, and obstructing the flow of the molten solder to the face of the mold, substantially as described.

3. The process of making disk sound record molds having central holes therein, consisting in placing a backing plate having a central hole upon the back of a disk mold with soldering material interposed between the same, placing a centering pin in the central holes through the mold and backing, and pressing the mold and backing together with application of heat to solder the same together while sealing the space around the pin to prevent the soldering material running through the holes, substantially as described.

4. The process of making disk sound record molds having central holes therein, consisting in placing a backing plate having a central hole upon the back of a disk mold with soldering material interposed between the same, placing a centering pin in the central holes through the mold and backing, laying the mold face downward upon a plate of material which will not injure the mold surface or adhere to the same under the necessary heat and pressure, and exerting pressure upon the backing plate with application of heat sufficient to melt the soldering material and solder the backing and mold together, while sealing the space around the pin to prevent the soldering material running through the holes, substantially as described.

5. The process of making disk sound record molds having central holes therein, consisting in placing a backing plate having a central hole upon the back of a disk mold with soldering material interposed between the same, placing a centering pin in the central holes through the mold and backing, laying the mold face downward upon a plate of material which will not injure the mold surface or adhere to the same under the necessary heat and pressure, placing a powdered material between the mold and the plate and around the centering pin, the said material being of such nature as to fuse upon application of heat to seal the opening around the pin, but not to adhere to the mold surface after the completion of the process, or to injure the same, and applying heat and pressure upon the backing plate to solder the same to the mold and fuse the powdered material to seal the opening around the pin, substantially as described.

6. The process of making disk sound record molds having central holes therein consisting in placing a backing plate having a central hole upon the back of a disk mold with soldering material interposed between the same, laying the mold face downward upon a substance which will not injure the mold surface or adhere to the same under the necessary heat and pressure, exerting pressure upon the backing plate with application of heat sufficient to melt the soldering material and solder the backing and mold together, and obstructing the flow of the molten solder through the center and around the edges of the mold to the face thereof, substantially as described.

7. The process of making disk sound record molds, consisting in placing a backing plate upon the back of a disk mold with soldering material interposed between the same, laying the mold face downward upon a plate of a phenolic condensation product which is soft or plastic when heated, and which will not adhere to the mold surface after the completion of the process, and exerting pressure upon the backing plate with application of heat sufficient to melt the soldering material and solder the backing and mold together, substantially as described.

8. The process of making disk sound record molds having central holes therein, consisting in placing a backing plate having a central hole upon the back of a disk mold with soldering material interposed between the same, placing a centering pin in the central holes through the mold and backing, laying the mold face downward upon a plate of material which will not injure the mold surface or adhere to the same under the necessary heat and pressure, placing between the mold and plate and around the centering pin a powdered mass of material which will fuse upon application of heat and subsequently harden into a final infusible phenolic condensation product, and applying heat and pressure upon the backing plate to solder the same to the mold and fuse the powdered material to seal the opening around the pin, and to subsequently harden the said material, substantially as described.

This specification signed and witnessed this 15th day of November, 1910.

JONAS W. AYLSWORTH.
EDWARD L. AIKEN.

Witnesses:
DYER SMITH,
ANNA R. KLEHM.